United States Patent
Hawk et al.

(10) Patent No.: US 6,400,879 B1
(45) Date of Patent: Jun. 4, 2002

(54) HIGHLY NON-LINEAR SINGLE MODE WAVEGUIDE

(75) Inventors: Robert M. Hawk, Pawleys, SC (US); Daniel A. Nolan, Corning; Steven H. Tarcza, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/600,111

(22) PCT Filed: Jan. 7, 1999

(86) PCT No.: PCT/US99/00287

§ 371 (c)(1), (2), (4) Date: Jul. 7, 2000

(87) PCT Pub. No.: WO99/36816

PCT Pub. Date: Jul. 22, 1999

Related U.S. Application Data

(60) Provisional application No. 60/071,732, filed on Jan. 16, 1998.

(51) Int. Cl.$^7$ .................................................. G02B 6/02
(52) U.S. Cl. ....................................... 385/124; 385/123
(58) Field of Search ............................... 385/123, 124, 385/126, 127

(56) References Cited

U.S. PATENT DOCUMENTS 4,755,022 A   7/1988   Ohashi et al. ........... 350/96.33

OTHER PUBLICATIONS

Kato, T., et al., "Estimation of Nonlinear Refractive Index in Various Silica–Based Glasses for Optical Fibers", Optics Letters, vol. 20, No. 22, Nov. 15, 1995, pp. 2279–2281.

Onishi, M. et al., "Highly Nonlinear Dispersion Shifted Fiber and its Application to Broadband Wavelength Converter", ECOC 97, 22–25 Sep. 1997, Conference Publication No. 448, pp. 114–118.*

M. N. Islam, "Ultrafast Fiber Switching Devices and Systems", copyright AT&T, 1992, pp. 22–26.

* cited by examiner

*Primary Examiner*—Cassandra Spyrou
*Assistant Examiner*—Alessandro V. Amari
(74) *Attorney, Agent, or Firm*—William J. Chervenak

(57) ABSTRACT

Disclosed is a single mode optical waveguide fiber having a core region refractive index profile designed to provide a highly non-linear refractive index. The core index profile of the highly non-linear waveguide is an α-profile which has pre-selected values of relative refractive-index and core diameter so as to retain the advantageous optical waveguide properties of low attenuation, properly placed zero dispersion and cut off wavelengths, low, positive total dispersion over a pre-selected wavelength range, and low dispersion slope.

8 Claims, 2 Drawing Sheets

HIGHLY NON-LINEAR SINGLE MODE WAVEGUIDE

This application is based upon the provisional application Ser. No. 60/071,732, filed Jan. 16, 1998, which we claim as the priority date of this application.

BACKGROUND OF THE INVENTION

The invention relates to a single mode waveguide fiber having a refractive index profile, a core diameter, and a relative index which provide a high non-linearity coefficient. In particular, the high non-linearity coefficient is obtained together with pre-selected values for zero dispersion wavelength, cut off wavelength, and spectral attenuation in the 1550 nm operating window.

The $\alpha$-profile waveguide fiber core has been studied in considerable detail over the past several decades. The design of the first single mode waveguide to be manufactured included a step index profile in the central core region.

Core refractive index profile design has evolved as waveguide optical systems requirements have changed. The study of the core profile has been driven by the need for such waveguide features as:

positioning of cut off wavelength;
 positioning of zero dispersion wavelength;
 lower attenuation;
 improved bend resistance; and,
 lower total dispersion and dispersion slope.

More recently, the very high performance telecommunication systems, i.e., those which include multiplexing, high data rates, long regenerator spacing, soliton propagation, or optical amplifiers, have resulted in a broader study of core index profiles to include designs which have high effective area to minimize signal distortion and dispersion due to non-linear effects.

In certain devices, however, increase in non-linear index of refraction or decrease in effective area can improve performance. One notable case in which performance is enhanced by increased non-linearity is that of a wavelength conversion device based upon modulational instability.

What is required by devices which make use of highly non-linear waveguide fiber is that the non-linear waveguide retain such characteristics as those noted above. The difficulty of making non-linear waveguides is therefore compounded because increased non-linearity usually requires increased concentration of glass forming metal oxides, termed dopants, which alter the waveguide core refractive index. The increased dopant concentration results in higher attenuation and effects mode power distribution which in turn effects the waveguide properties required for efficient operation of a device using the non-linear waveguide. In particular, increased dopant concentration causes the zero dispersion wavelength to increase beyond the wavelength region useful for soliton propagation.

DEFINITIONS

The effective area is $A_{eff} = 2\pi (\int E^2 r\, dr)^2 / (\int E^4 r\, dr)$, where the integration limits are 0 to $\infty$, and E is the electric field associated with the propagated light. An effective diameter, $D_{eff}$, may be defined as, $A_{eff} = \pi (D_{eff}/2)^2$.

The relative index, $\Delta$, is defined by the equation, $\Delta = (n_1^2 - n_2^2)/2n_1^2$, where $n_1$ is the maximum refractive index of the index profile segment 1, and $n_2$ is the refractive index in the reference region which is usually taken to be the minimum index of the clad layer.

For the particular profile described in this application, the core region has one segment. The notation $\Delta_o$ is used to describe the relative index of this single segment. The notation $\Delta_c$ is used to describe the relative index of the clad region.

The term refractive index profile or simply index profile is the relation between $\Delta$ % or refractive index and radius over a selected portion of the core. The term alpha profile refers to a refractive index profile which follows the equation, $n(r) = n_0 (1 - \Delta [r/a]^\alpha)$ where r is core radius, $\Delta$ is defined above, a is the last point in the profile, r is chosen to be zero at the first point of the profile, and $\alpha$ is an exponent which defines the profile shape. Other index profile shapes include a step index, a trapezoidal index and a rounded step index, in which the rounding is due to dopant diffusion in regions of rapid refractive index change.

SUMMARY OF THE INVENTION

The novel single mode waveguide of this application meets the need for a waveguide which is highly non-linear, but retains the required characteristics in terms of low attenuation in the 1550 nm window, properly positioned zero dispersion and cut off wavelengths, low, positive total dispersion, and low dispersion slope.

A first aspect of the invention is a single mode optical waveguide having a core region surrounded by a clad layer. The core region has a surface, a diameter, a relative refractive index, $\Delta_o$, and a refractive index profile. The diameter of the core is measured from the central long axis of the single mode fiber to the core surface. The relative index of the core, $\Delta_o$, is greater than $\Delta_c$, the relative index of the clad. Both relative indexes are referenced to $n_c$, the minimum refractive index of the clad layer.

The core region profile is an x-profile, for which the relative index is in the range 0.016 to 0.040, and the diameter is in the range 3 $\mu$m to 8 $\mu$m. Given this basic structure, two key waveguide fiber parameters, which serve to define the waveguide, are, a zero dispersion wavelength, $\lambda_o$, in the range of about 1500 nm to 1570 nm, and a non-linearity constant in the range of about $$3 \times 10^{-16} \frac{cm2}{W} \text{ to } 13 \times 10^{-16} \frac{cm2}{W}.$$

The non-linearity constant is $n_2$ in the equation for refractive index, $n = n_o + n_2 P/A_{eff}$, in which P is transmitted power, $n_o$ is the linear refractive index, and $A_{eff}$ is the effective defined above.

This novel waveguide, when incorporated in a wavelength conversion device, improves the performance thereof. In an embodiment of this aspect, the waveguide core has $\alpha$ in the range of about 1.8 to 2.4, core diameter in the range 5 $\mu$m to 6 $\mu$m, and core relative index in the range of about 0.019 to 0.030. In this embodiment and in the first aspect of the invention, cut off wavelength is in the range of about 1400 nm to 1500 nm, attenuation at 1550 nm is not greater than 1 dB, the dispersion slope is in the range of 0.03 ps/nm²-km to 0.10 ps/nm²-km, and total dispersion over the wavelength range 1520 nm to 1600 nm is positive but not greater than about 2 ps/nm-km.

Calculations have shown that the required waveguide properties together with the required waveguide non-linearity can be realized when the α is very large, which means the α-profile is essentially a step index profile. Thus, α values in the range of 1.8 to infinity are contemplated by the inventors. Thus an embodiment of the invention is a step profile or a rounded step profile. The Δ value and core diameter do not change in this embodiment of the profile shape.

In another embodiment of this first aspect the clad layer refractive index profile is flat and has a constant refractive index equal to the minimum index, $n_c$.

The invention may also be described solely in terms of a particular geometry associated with a particular a of the waveguide α-profile. Thus, the invention is a single mode optical waveguide fiber having a core and a clad as described in the first aspect of the invention above. The α of the core region profile is in the range of about 1.8 to 2.4, the relative index of the core is in the range 0.019 to 0.030, and the core diameter is in the range 5 μm to 6 μm. In an embodiment preferred because of simplicity of manufacture, the clad layer refractive index profile is flat and has a refractive index equal to the minimum clad index, $n_c$. Here again, higher values of α are calculated to be effective in producing a waveguide having all the required properties. Thus, step index and rounded step index are also proper descriptors of the profile shape of the novel waveguide.

DETAILED DESCRIPTION OF THE INVENTION

The use of a step index profile or an α-profile as the core profile of a single mode waveguide is known in the art. The invention disclosed and described herein relates to a single mode waveguide in which the non-linearity of the of the waveguide is enhanced. This is in contrast to recent core design work which was undertaken to reduce non-linear effects by increasing the effective area of the waveguide.

One problem solved by the present invention is that of achieving high non-linearity while maintaining the zero dispersion wavelength within a pre-selected range of wavelengths. In addition, the novel waveguide retains other important characteristics such as low attenuation, properly positioned cut off wavelength, low, positive total dispersion, and low dispersion slope.

Figure 1:
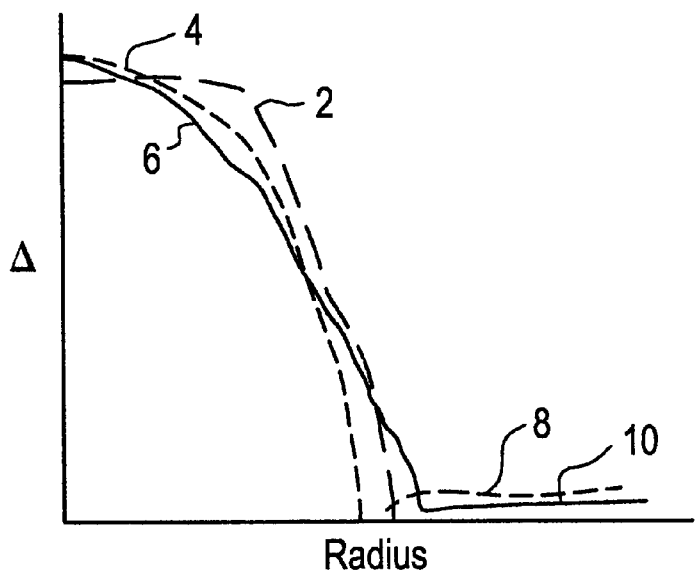
FIG. 1 is an illustrative chart showing the refractive index profile of the single mode waveguide and variations thereof.

The class of profiles found to provide these key characteristics is illustrated in FIG. 1, in which the refractive index profile is plotted in terms of relative index, Δ, versus waveguide radius. Solid line 6 represents an α-profile which may have an α around 2, i.e., the profile may approximate a parabola. Dashed lines 2 and 4 in FIG. 1 indicate that small variations on the α-profile will probably not change the mode power distribution enough to move the waveguide parameters out of their pre-selected ranges. Dashed curve 11 is a slightly rounded step index profile which has been shown by calculation to provide a waveguide fiber having all the required properties.

Solid line 10 and dashed line 8 indicate two shapes which the clad layer profile may have. Small variations of this profile also may be made without materially effecting the mode power distribution and the waveguide parameter which depend thereon. Usually the clad layer index profile is chosen to be flat to simplify manufacturing.

Example—Highly Non-linear Waveguide having Controlled Parameters

Figure 2:
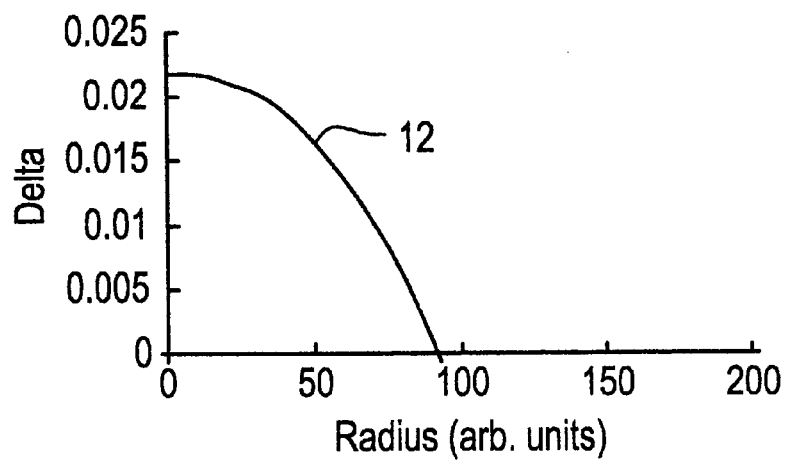
FIG. 2 is a fitted curve of relative index versus radius for an embodiment of the single mode waveguide.
Figure 3:
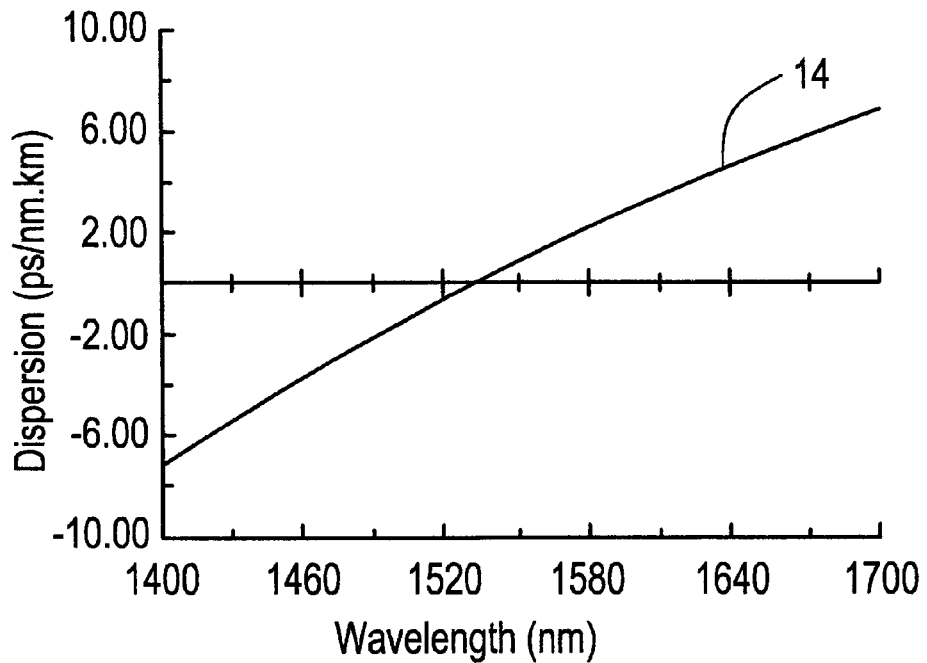
FIG. 3 is a chart of total waveguide dispersion versus wavelength.

A waveguide was fabricated having the core refractive index profile 12 shown in FIG. 2. The α of the profile was determined by a least squares fit to be about 2.22. The relative index of the core, $\Delta_o$, was about 0.0218. The core diameter was about 5.66 μm. The waveguide clad layer was flat and consisted essentially of silica. The outer diameter of the waveguide was 125 μm. The measured parameters of this waveguide were as follows:

attenuation over the wavelength range 1500 nm to 1600 nm was no greater than about 0.80 dB/km;

zero dispersion wavelength was about 1532 nm;

cut off wavelength was about 1467 nm;

total dispersion, shown as curve 14 in FIG. 3, over the wavelength range 1532 nm to 1600 nm was positive and no greater than about 2 ps/nm-km;

dispersion slope was about 0.048 ps/n m²-km; and, non-linearity constant about $$9.9 \times 10^{-16} \frac{cm2}{W}.$$

These parameters are ideal for operation of a non-linear device in the operating window centered near 1550 nm.

Figure 4:
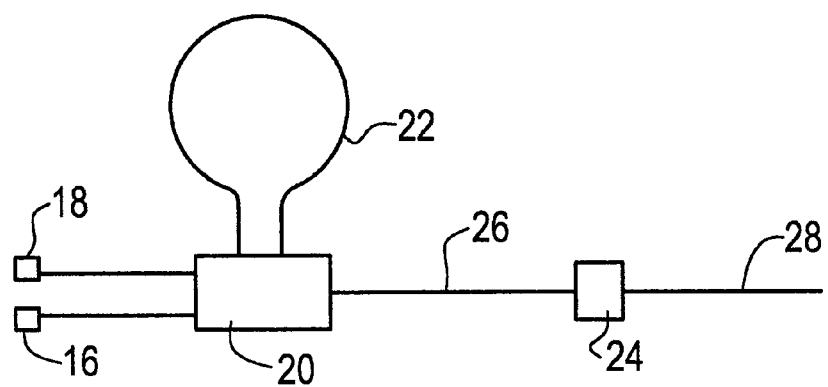
FIG. 4 is a schematic illustration of the non-linear waveguide incorporated in a loop mirror in a wavelength converter device.

A simplified schematic of a wavelength converter is shown in FIG. 4. A much more detailed description of this embodiment of the converter is given in U.S. patent application Ser. No. 09/008,179. In FIG. 4, light pulses from pump laser 18 and signal laser 16 are optically connected to coupler 20. Coupler 20 directs the light pulses into the loop 22 which comprises highly non-linear single mode waveguide fiber such as that set forth in the example above. The coupler is designed to propagate signal light clockwise about waveguide loop 22. The pump light may be coupled into the loop 22 to propagate in either or both the clockwise and counter-clockwise direction. The pump pulses and signal pulses interact over the length of loop 22 such that energy is transferred from the pump pulses to the original signal pulse and to a signal pulse having a converted wavelength. These two signal wavelengths are coupled to waveguide fiber 26 and pass through filter 24 which filters out any co-propagating pump light. The signal pulses and the converted signal pulses are transmitted out of the wavelength converter along waveguide 28.

Although particular embodiments of the invention have been disclosed and described, the invention is nonetheless limited only by the following claims.

We claim:

1. A single mode optical waveguide fiber comprising:

a core region having a surface, a diameter, a relative refractive index, $\Delta_o$, and a refractive index profile, the single mode fiber having a long axis, the diameter being measured along a line perpendicular to the long axis and extending between two points on the core region surface; and, a clad layer surrounding and in contact with the core region surface, the clad layer having a refractive index profile, a relative refractive index $\Delta_c$, and a minimum refractive index $n_c$ which is the reference index for the relative refractive indexes and $\Delta_o > \Delta_c$;

in which,
the core region refractive index profile is an α-profile, the relative index of the core is in the range 0.016 to 0.040, and the core diameter is in the range 3 μm to 8 μm; and, in which, the waveguide has a zero dispersion wavelength and a non-linearity constant where;
the zero dispersion wavelength, $\lambda_o$, is in the range of about 1500 nm to 1570 nm, and the non-linearity constant is in the range of about $$3 \times 10^{-16} \frac{cm2}{W} \text{ to } 13 \times 10^{-16} \frac{cm2}{W}.$$

2. The single mode waveguide of claim 1 in which $1.8 \leq \alpha \leq 2.4$, the core diameter is in the range of about 5 μm to 6 μm, and, the relative index of the core region is in the range of about 0.019 to 0.03.

3. The single mode waveguide of either claim 1 or 2 in which the cut off wavelength is in the range of about 1400 nm to 1500 nm, attenuation at 1550 nm is not greater than 1 dB/km, the dispersion slope is in the range of 0.03 ps/nm²-km to 0.10 ps/nm²-km, and total dispersion over the wavelength range 1520 nm to 1600 nm is positive but not greater than about 2 ps/nm-km.

4. The single mode optical waveguide of claim 1 in which the clad refractive index profile is flat and has a refractive index of $n_c$.

5. The single mode optical waveguide of claim 1 in which the index profile shape is a step or a rounded step.

6. An optical circuit which incorporates the non-linear waveguide of claim 1.

7. A single mode optical waveguide fiber comprising:
a core region having a surface, a diameter, a relative refractive index, $\Delta_o$, and a refractive index profile, the single mode fiber having a long axis, the diameter being measured along a line perpendicular to the long axis and extending between two points on the core region surface; and, a clad layer surrounding and in contact with the core region surface, the clad layer having a refractive index profile, a relative refractive index $\Delta_c$, and a minimum refractive index $n_c$ which is the reference index for the relative refractive indexes and $\Delta_o > \Delta_c$;

in which,
the core region refractive index profile is an α-profile having α in the range of about 1.8 to 2.4, the relative index of the core is in the range 0.019 to 0.030, and the core diameter is in the range 5 μm to 6 μm.

8. The optical waveguide fiber of claim 7 in which the clad refractive index profile is flat and has a refractive index of $n_c$.

* * * * *